US006911167B2

(12) United States Patent
Rivola

(10) Patent No.: US 6,911,167 B2
(45) Date of Patent: Jun. 28, 2005

(54) METHOD FOR LOADING CERAMIC TILE FORMING MOULDS, RELATIVE MEANS FOR ITS IMPLEMENTATION, AND TILES OBTAINED THEREBY

(75) Inventor: Pietro Rivola, Imola (IT)

(73) Assignee: Sacmi-Cooperativa Meccanici Imola-Soc. Coop. A.R.L., Imola (IT)

( * ) Notice: Subject to any disclaimer, the term of this patent is extended or adjusted under 35 U.S.C. 154(b) by 363 days.

(21) Appl. No.: 10/189,221

(22) Filed: Jul. 5, 2002

(65) Prior Publication Data

US 2003/0006521 A1 Jan. 9, 2003

(30) Foreign Application Priority Data

Jul. 5, 2001 (IT) ..................................... RE2001A0073

(51) Int. Cl.[7] .......................... B29C 59/00; D04H 1/16; D04H 1/20; B65B 1/20

(52) U.S. Cl. ....................... 264/101; 264/112; 264/113; 264/119; 264/122; 141/11

(58) Field of Search ................................ 264/109–128, 264/101; 141/11

(56) References Cited

U.S. PATENT DOCUMENTS 6,684,913 * 2/2004 Rivola ........................... 141/1

FOREIGN PATENT DOCUMENTS

| | | | |
|---|---|---|---|
| EP | 1 074 361 | A2 | 2/2001 |
| FR | 1 402 317 | A | 6/1965 |
| JP | 09 048021 | A | 2/1997 |

* cited by examiner

*Primary Examiner*—Stephen J. Lechert, Jr.
(74) *Attorney, Agent, or Firm*—Browdy and Neimark, P.L.L.C.

(57) ABSTRACT

Method for loading ceramic moulds presenting a die plate having at least one forming cavity in which a die is slidingly received, comprising the following operative steps for each complete loading cycle: preparing a powder layer at least the upper part of which has properties conforming to the required aesthetic characteristics of the exposed face of the tile; transferring said layer to above said at least one forming cavity; depositing into said at least one cavity a powder layer having a thickness greater than that necessary to obtain the desired tile thickness, and before pressing removing, by suction, the surface layer of the powder contained in the mould cavity, without appreciable mixing of the powder present at the interface between the surface layer and the underlying material.

7 Claims, 3 Drawing Sheets

METHOD FOR LOADING CERAMIC TILE FORMING MOULDS, RELATIVE MEANS FOR ITS IMPLEMENTATION, AND TILES OBTAINED THEREBY

This invention relates in a totally general manner to the manufacture of ceramic tiles, and more particularly concerns a method for loading powder materials into the relative forming moulds.

The invention also relates to the means for implementing said method, and the materials obtained thereby.

The ceramic tile manufacturing sector is known to constantly seek new and original ornamental motifs, and in particular decorations reproducing the appearance of natural stone, such as marble, which is known to present veining and elongate striations of various shapes and colours. Decorative motifs reproducing said appearance typical of marble can be obtained by the modern ceramic technology involved in the manufacture of fine porcellainized sandstone, which is well known to the expert of this sector, and will therefore not be described in detail.

It is sufficient to state that such decorative motifs can concern either the entire bulk, i.e. the entire thickness of the tile, or just the layer located at the exposed face of said tile.

In particular, in the second case double loading is effected, the first loading using a base material of not particular value intended to form the basic body or support for the tile, whereas the second uses a finishing material, i.e. possessing properties such as to provide the desired characteristics of the exposed face of the tile. Said second material consists of at least two at least partly mixed powders having different characteristics, typically different colours.

The iii relates to both said loading methods.

For simplicity, express reference will be made hereinafter to tiles decorated throughout their bulk, it being however understood that that stated is also valid for tiles decorated through only a part of their bulk. Such bulk-decorated tiles are known to be formed by moulds comprising at least one forming cavity which is filled by a suitable loading carriage provided with a loading compartment for retaining the powders, the loading compartment being usually provided with a grid.

The carriage is driven with horizontal reciprocating rectilinear movement between a retracted position in which it disposes the loading compartment in correspondence with a powder supply station, and an advanced position in which it disposes the loading compartment above said at least one forming cavity, where the powders fall by gravity.

In certain cases the powder mass consisting of at least two at least partly mixed materials having different characteristics, typically different colours, is directly loaded into the loading compartment, whereas in other cases said two materials are contained in respective hoppers located above the grid.

In all cases the grid presents a capacity greater than that of the forming cavity, in order to obtain complete filling of the forming cavity, and hence the desired tile thickness.

The lower generators of the grid are normally positioned in line with the upper face of the die plate, which defines the upper edge of the forming cavity, in front of the grid there usually being provided a scraper which during the carriage retraction movement smoothes the material deposited in the forming cavity. In some cases the grid can be slightly spaced from the die plate.

Said carriage retraction movement causes excess material still present within the grid to slip onto the surface layer of the material present in the forming cavity, with the result that the original powder distribution is altered.

Essentially, the horizontal movement of the carriage produces, on the upper surface of the material present in the forming cavity, a mixing effect generating a layer of practically uniform colour that masks the underlying distribution of the differently coloured powders.

The resultant aesthetic effect is obviously unacceptable, to overcome this drawback it then being necessary to subject the already formed and fired tile to a grinding operation aimed at removing said surface layer of uniform colour in order to expose the true distribution of the underlying variously coloured powders.

This involves fairly considerable costs, due in particular to the necessary equipment, and problems related to the containing and disposal of the fine powders produced by said grinding.

In addition it is not possible to produce tiles having irregular surfaces, for example raised or projecting portions reproducing the splits in natural stone, as said grinding destroys such irregularities.

An object of the iii is to provide a method able to overcome said problems, in particular able to eliminate said surface defects due to said slippage during the filling of the mould forming cavity, in order not to require subsequent grinding of the tile.

Another object is to provide a method by which tiles can be obtained having their exposed face not only multi-coloured but also irregular, for example provided with projections recalling the splitting of natural stone. Another object is to provide means for implementing said method within the context of a simple, rational, reliable, long-lasting and low-cost construction.

Said objects are attained by virtue of the characteristics indicated in the claims.

The characteristics and merits of the invention will be apparent from the ensuing detailed description thereof given with reference to the figures of the accompanying drawings, which illustrate by way of non-limiting example three preferred embodiments of the means for implementing the method of the invention.

Figure 1:
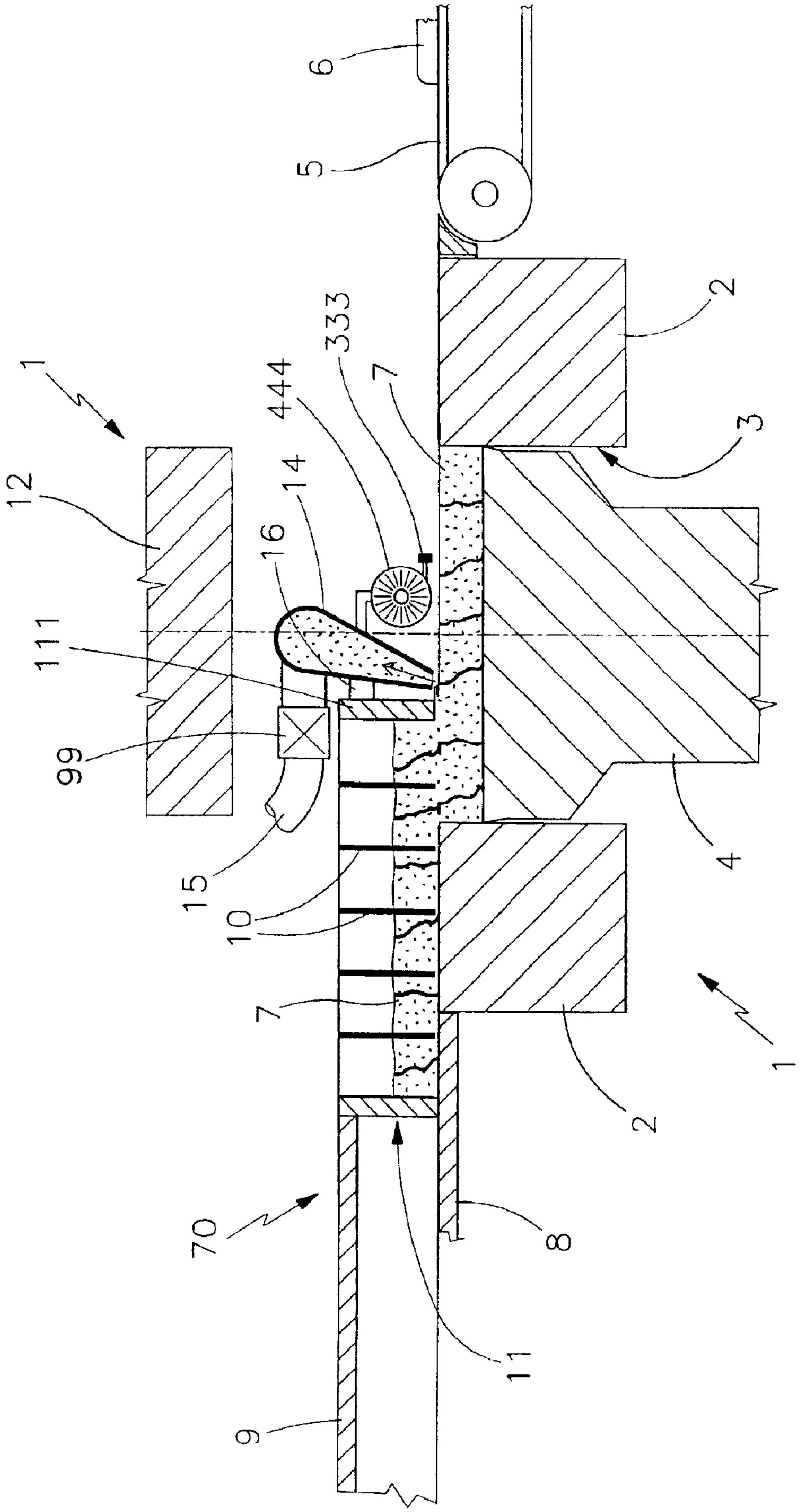
FIG. 1 is a side section showing the means of the iii associated with a loading carriage of a ceramic mould.
Figure 2:
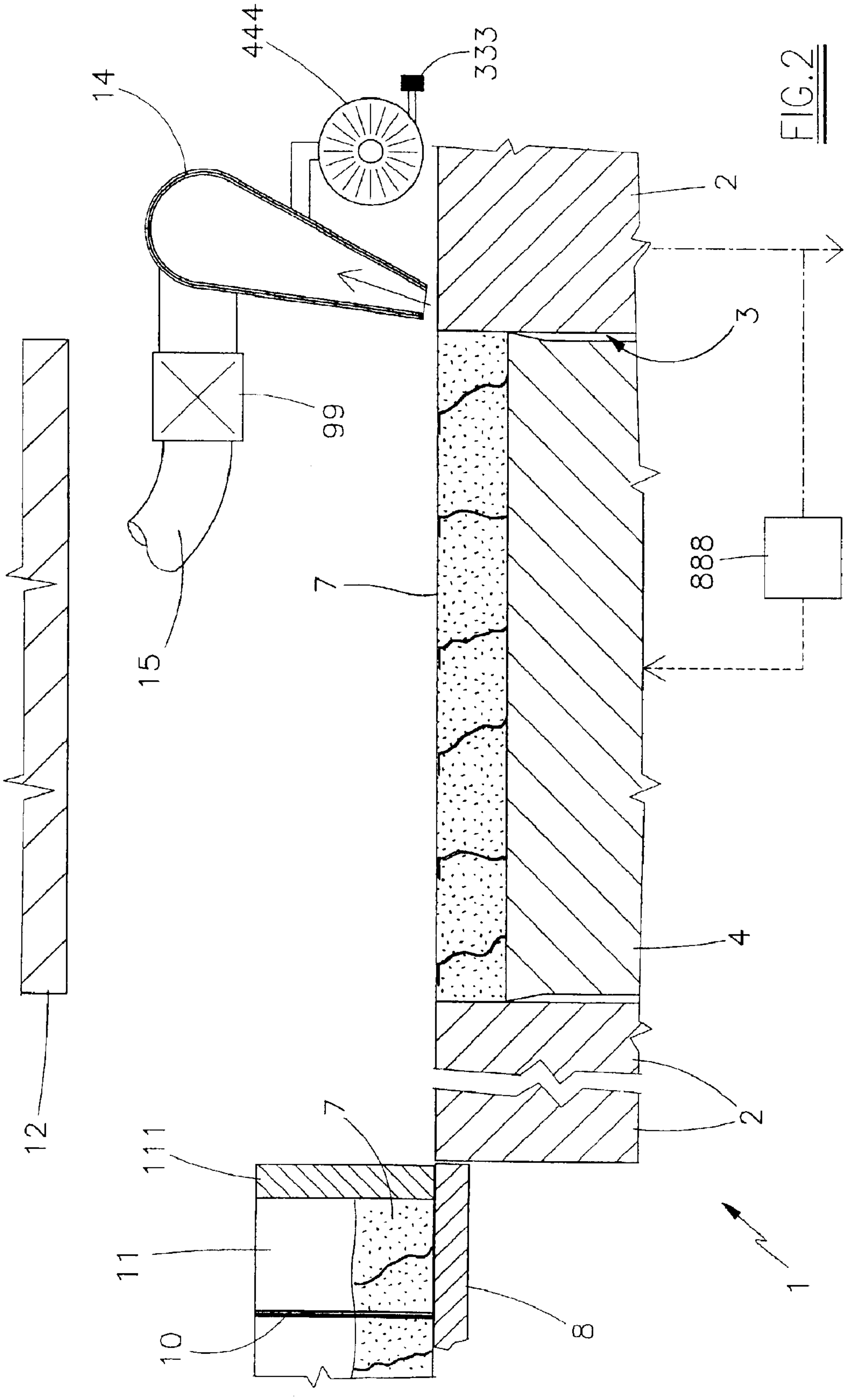
FIG. 2 is a view similar to the preceding, showing a modified embodiment of the means for implementing the method of the iii.

Said figures, and in particular FIGS. 1 and 2, show a usual ceramic mould, indicated overall by the reference numeral 1, comprising a die plate 2 having a single forming cavity 3, a lower die 4 slidingly received within said forming cavity 3, and an upper die 12 carried by the movable crosspiece of a ceramic press, not shown because of known type. It should be noted that the mould 1 can have any number of forming cavities 3. The die plate 2 and the die 4 are positioned on the bed of the ceramic press by means of known devices able to adjust their height as required.

On one side of the mould 1 there is a conveyor 5 for removing the formed tiles 6, and on the other side there is a horizontal operating table 8 with which a unit 70 for loading the multi-colour powder 7 into said cavity 3 is associated.

Said unit 70 comprises a carriage 9 which is driven with horizontal reciprocating rectilinear movement and is provided at its front with a loading compartment 11 containing a grid 10 for retaining the powders. The grid 10 can have a lattice configuration different from that shown. The carriage 9 is arranged to translate between a retracted position in which the loading compartment 11 lies in correspondence with a loading station for the multi-colour powder 7, and an advanced position in which it lies above the cavity 3.

With reference to FIG. 2 the lower edges of said loading compartment 11 and said grid 10 are in contact with the upper face of the table 8, whereas in the embodiment of FIG. 1 the lower edge of the front transverse wall 111 of the loading compartment 11 and the lower edges of the grid 10 are spaced from the table 8 by a small amount.

For the purposes of the iii, said amount can be between 0.2 and 4 mm. As a variant, the lower wall 111 can be made to slide vertically together with the grid 10 in order to adjust their height as required.

Said adjustment can be made by manual means, such as threaded members, or by automatic means controlled by the ceramic press control system.

In front of said wall 111 (scraper) there is a finishing member.

It comprises an elongate chamber 14 of constant cross-section which is positioned transversely to the direction in which the carriage 9 travels, and is connected to a vacuum environment by at least one suction tube 15 intercepted by a regulator valve 99.

The chamber 14 presents a length at least slightly greater than the corresponding dimension of the forming cavity 3, its cross-section tapering downwards where it terminates with a totally extending narrow suction port in the form of a slot.

Relative to the plane defined by the upper face of the die plate 2, said port is positioned with the plane in which it lies slightly inclined so that those generators on the conveyor 5 side lie virtually in line with the die plate 2.

The chamber 14 is fixed to the front wall 111 (scraper) of the loading compartment 11 by two brackets 16 (see FIG. 1) which, if the wall 111 is adjustable in height, are preferably fixed to the sides of the loading compartment 11.

In this case the material contained in the mould cavity extends upwards beyond the edge of the die plate by an amount representing the layer of material which is to be removed by the chamber 14.

As an alternative the chamber 14 and the relative accessories can be free of the loading compartment 11 and be positioned on an independent drive unit controlled by the ceramic press control system.

For reasons which will become apparent hereinafter, said independent unit must be able to move the chamber 14 relative to the loading compartment 11 through an amount at least equal to that dimension of the cavity 3 in the direction of movement of the carriage 9.

Finally, in front of the chamber 14 there are a usual motorized transverse horizontal cylindrical brush 444 provided to clean the upper face of the die plate 2 during the advancement strokes of the carriage 9, and a pusher 333 for removing the tiles 6.

If the cavity 3 is filled by the system of FIG. 1, the chamber 14 and the relative accessories can be relatively close to said wall 111 (scraper) as shown. If however the loading system of FIG. 2 is used, the front generator of the suction port of the chamber 14 must be spaced from the wall 111 by an amount at least equal to that dimension of the cavity 3 in the sliding direction of the carriage 9.

Figure 3:
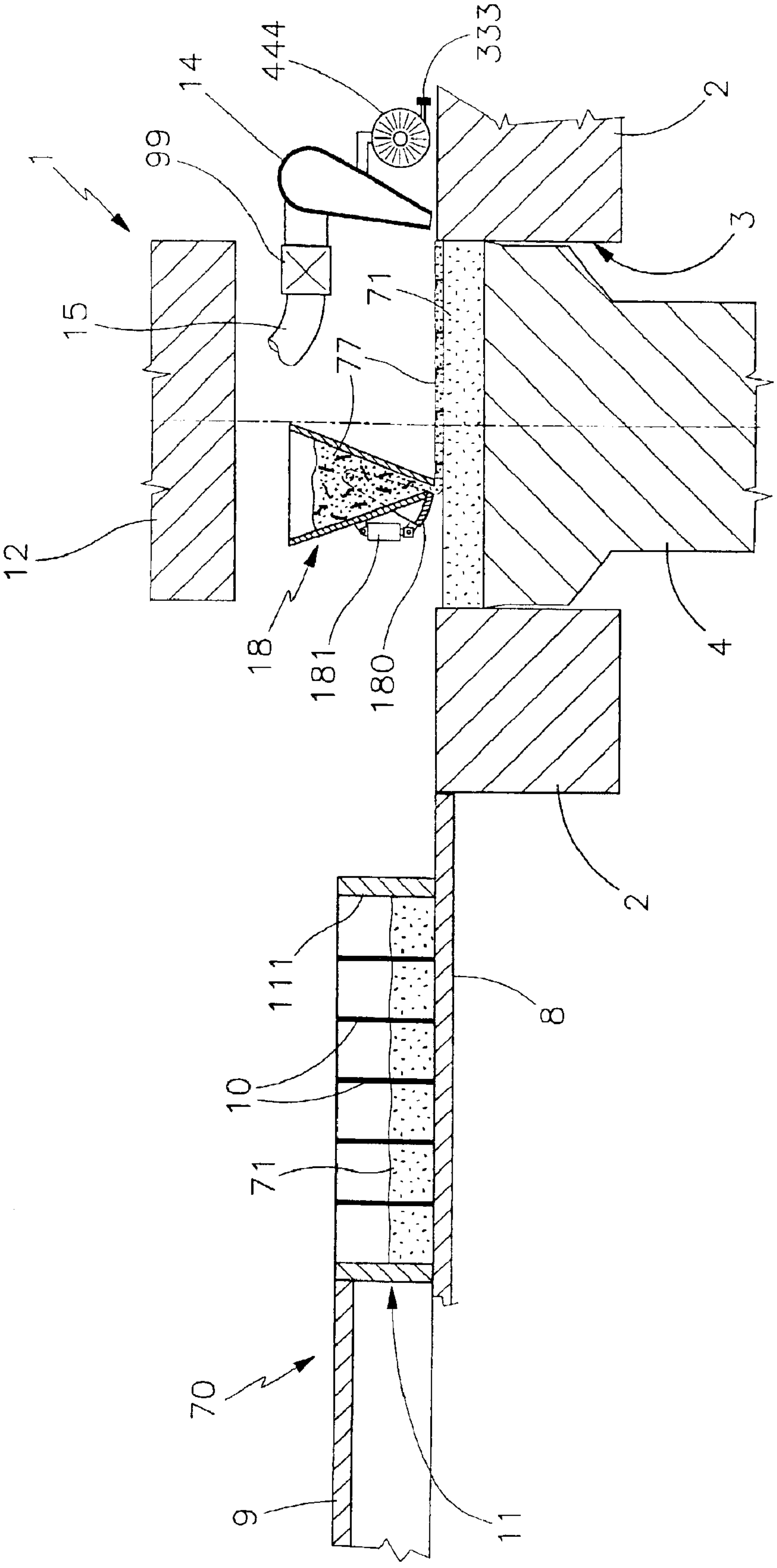
FIG. 3 is a view similar to the preceding, showing the means of the iii associated with a loading unit operating in accordance with the double loading technique.

The aforegiven considerations made with reference to the position of the chamber 14 are also valid for the double loading system of FIG. 3.

This shows a die plate 2 with relative forming cavity 3; a loading compartment 11 with relative grid 10; a hopper 18 with flow regulator valve 180 operated by a cylinder-piston unit 181 controlled by the press control system; and a suction chamber 14 provided with a brush 444 and pusher 333.

Specifically, the loading compartment 11 is intended to contain a not particularly valuable powder material 71, suitable for forming the base or support part of the tile 6, whereas the hopper 18 is intended to contain a finishing material 77, i.e. able to provide the desired aesthetic characteristics for the exposed face of the tile 6.

Said finishing material 77 can comprise at least two powders with different characteristics, typically two differently coloured powder masses at least partially mixed together.

In addition the lower generators of the grid 10 and scraper 111 can be coplanar and positioned in line with the upper face of the die plate 2 or be slightly spaced therefrom as in the preceding case, whereas the lower generators of the discharge port of the hopper 18 can be in line with or slightly spaced from the die plate 2; the lower port of the chamber 14 is preferably positioned to graze the die plate 2 as in the preceding cases. With reference to FIG. 1 the described means operate in the following manner.

On termination of a pressing operation the die 4 lies in its maximum raised position, not shown, where it supports the previously formed tile 6, with its lower surface flush with the die plate, while awaiting the loading carriage 9.

When this advances, the pusher 333 urges the tile 6 onto the conveyor 5, and the brush 444 cleans the upper face of the die plate 2. On termination of the advancement stroke of the carriage 9 the brush 444 is raised and stops, and the die 4 is brought into the illustrated position in which it frees the upper part of the cavity 3, which fills with multi-colour powder 7 During the next retraction stroke of the carriage 9, and by virtue of the distance existing between the die plate 2 and the lower edges of the grid 10 and scraper 111, a thin layer of powder material 7 forms on the surface defined by the upper face of the die plate 2.

Said thin layer is in excess of the layer of powder 7 required to obtain the desired thickness for the tile 6, which is defined by the depth of the cavity 3.

The surface layer of the multi-colour material 7, which is subjected to the inconvenient surface slippage and mixing stated in the introduction, is removed by the chamber 14, the lower port of which, maintained constantly under adequate vacuum during the return stroke of the carriage 9, raises and removes said surface layer, to hence display the true sharp distribution of the at least two constituent materials of the multi-colour powder 7, without appreciable mixing thereof.

During the outward stroke of the carriage 9 the chamber 14 is disconnected from the vacuum environment by the automatic operation of the valve 99.

After this, the other stages of the cycle take place, i.e. the lower die 4 firstly moves into its maximum lowered or pressing position, then the upper die 12 is lowered to form the tile 6, and finally the two dies 12 and 4 are raised nearly simultaneously, with the first 12 assuming the position shown in FIG. 1 and the second 4 lying flush with the die plate 2 to offer the tile 6 to the pusher 333.

With the embodiment of FIG. 2, the lower generators or edges of the grid 10 and loading compartment 11 are practically in contact with the upper face of the table 8, and the overall layer of multi-colour powder 7 is completely contained within the cavity 3 before the operation of the chamber 14.

More specifically, during the loading of the multi-colour powder 7 the die 4 is lowered by a distance equal to the thickness of the powder intended to form the tile 6 plus a thin layer, the surface region of which is scraped by the loading compartment 11.

The said lowered position of the die 4 is indicated by 991 in FIG. 2.

At this point it is possible to proceed in two modes.

A first mode consists of raising the die 4, after passage of the loading compartment 11 but before the arrival of the chamber 14, by a distance equal to the thickness of said surface layer, to make it available to the chamber 14 (FIG. 2).

The second mode consists of lowering the die plate 2 by a distance equal to the thickness of said thin layer, said lowering occurring preferably after the loading compartment 11 has reached the operating table 8.

In that case the chamber 14 is supported by its own drive unit by way of means which enable its height to be adjusted, to enable it to lie practically in contact with the die plate 2 when in the lowered position.

By way of example, said height adjustment can be obtained either by automatic means or more simply by gravity.

In addition, with the described loading system there is preferably associated a processor 888 (FIG. 2) which is connected to the overall press control system to control the said vertical movements of the die 4 and die plate 2 in accordance with the two operative modes described with reference to FIG. 2.

Another loading mode for the cavity 3 is possible, consisting of maintaining the die 4 in the position shown by continuous lines in FIG. 2, and raising in the already explained manner the combined scraper and grid 111-10, or only the scraper 111 if the grid is already spaced, during the retraction of the carriage 9.

Specifically, said combination 111-10 is spaced from the die plate 2 by an amount equal to the thickness of the surface layer of powder to be removed before pressing and, once the scraper 111 has passed beyond the cavity 3, the said combination is again lowered into its starting position. The surface layer of multi-colour powder 7 is removed as previously. With the loading system of FIG. 3, during the return travel of the carriage 9 the die 4 becomes positioned at two different levels. When the die occupies the higher level, the loading compartment 11 deposits into the cavity 3 the required quantity of base material 71, which is scraped by the scraper 111.

When the scraper 111 has passed, and before the discharge port of the hopper 18 reaches the cavity 3, the die 4 moves to the lower level to hence free the upper part of the cavity 3. Then the port of the hopper 18 reaches the right edge (in FIG. 3) of the cavity 3, the valve 180 receives the command to open, to then close again when the hopper 18 reaches the left edge of the cavity 3.

In this manner, on the base material 71 present on the bottom of the cavity 3 a layer of multi-colour finishing material 77 is deposited to slightly project beyond the mouth of the cavity 3, this material being removed by the chamber 14, the suction of which is adjusted according to requirements. Also in the case of the second loading the port of the hopper 18 is flush with the die plate 2, and if desired a layer of material to be removed is made to project beyond the upper edge of the die plate 2 either by lowering this latter or by raising the die 4 as already stated.

The merits and advantages of the iii are apparent from the aforegoing description and from the accompanying figures.

It should be noted that the active face of the upper die 12 can be smooth or be relief contoured for the reasons explained in the introduction.

It should also be noted that a variant typically suitable for the loading system of FIG. 2 can be provided.

According to this variant the overall powder layer 7 or 71, 77 is deposited in the forming cavity, flush with the upper face of the die plate 2, and the chamber 14 is shaped to operate within the upper region of the cavity 3.

In particular the port of the chamber 14 can be shaped so that it can be inserted into the top of the cavity 3, the chamber 14 being secured to its support structure in a manner enabling it to be varied in height.

With this variant it is not necessary to vary the height of the die 4 or die plate 2 prior to the intervention of the chamber 14.

In the case of die plates with several cavities the chamber 14 presents a like number of portions each able to be inserted in to one of the mould cavities.

What is claimed is:

1. A method for loading ceramic moulds presenting a die plate having at least one forming cavity in which a die is slidingly received, comprising the following operative steps for each complete loading cycle:

preparing a powder layer at least the upper part of which has properties conforming to the required aesthetic characteristics of the exposed face of the tile, and transferring said layer to above said at least one forming cavity, characterised by comprising the following operative stages:

depositing into said at least one cavity a powder layer having a thickness greater than that necessary to obtain the desired tile thickness, and before pressing removing, by suction, the surface layer of the powder contained in the mould cavity, without appreciable mixing of the powder present at the interface between the surface layer and the underlying material.

2. A method as claimed in claim 1, characterised in that said surface layer is created above the plane defined by the upper edge of said at least one forming cavity.

3. A method as claimed in claim 1, characterised in that said surface layer is created in the interior of said at least one forming cavity, flush with its upper edge.

4. A method as claimed in claim 3, characterised in that said surface layer is removed by directly extracting it from the top of said at least one cavity.

5. A method as claimed in claim 3, characterised in that prior to said removal, said surface layer is raised beyond the upper surface of said at least one forming cavity.

6. A method as claimed in claim 5, characterised in that said raising is achieved by upwardly sliding the die relative to said at least one forming cavity.

7. A method as claimed in claim 5, characterised in that said raising is achieved by downwardly sliding the die plate relative to the die.

* * * * *